(12) United States Patent
Lu

(10) Patent No.: US 6,253,113 B1
(45) Date of Patent: Jun. 26, 2001

(54) CONTROLLERS THAT DETERMINE OPTIMAL TUNING PARAMETERS FOR USE IN PROCESS CONTROL SYSTEMS AND METHODS OF OPERATING THE SAME

(75) Inventor: Z. Joseph Lu, Glendale, AZ (US)

(73) Assignee: Honeywell International Inc, Morristowm, NJ (US)

( * ) Notice: Subject to any disclaimer, the term of this patent is extended or adjusted under 35 U.S.C. 154(b) by 0 days.

(21) Appl. No.: 09/137,358

(22) Filed: Aug. 20, 1998

(51) Int. Cl.[7] ................................................ G05B 13/02
(52) U.S. Cl. .................................. 700/28; 700/29; 700/44
(58) Field of Search .................................. 700/29, 36, 30, 700/31, 44, 45, 37, 32, 33, 34, 28

(56) References Cited

U.S. PATENT DOCUMENTS

| | | |
|---|---|---|
| 4,319,320 | 3/1982 | Sato et al. . |
| 4,736,316 | 4/1988 | Wallman . |
| 4,745,758 | 5/1988 | Putman et al. . |
| 4,855,896 | 8/1989 | Oho et al. . |
| 5,161,110 | 11/1992 | Dorchak . |
| 5,351,184 | 9/1994 | Lu et al. . |
| 5,457,625 * | 10/1995 | Lim et al. ............................ 364/149 |
| 5,481,456 | 1/1996 | Ogura . |
| 5,486,995 | 1/1996 | Krist . |
| 5,561,599 | 10/1996 | Lu . |
| 5,572,420 | 11/1996 | Lu . |
| 5,574,638 | 11/1996 | Lu . |
| 5,726,879 | 3/1998 | Sato ................................ 364/167.01 |
| 6,044,305 * | 3/2000 | Larson et al. ........................ 700/87 |

FOREIGN PATENT DOCUMENTS 37 15 437    11/1987 (DE) .

OTHER PUBLICATIONS

Haber, Robert and Bars, Ruth, "Robust Design of PID and IMC–Based Controllers in the Time Domain", IFAC Robust Control Design, Budapest, Hungary, pp. 365–370.

Pulkkinen, Jukka, Koivo, Heikka N., and Mä jelä, Keijo, "Tuning of a Robust PID Controller—Application to Heating Process in Extruder", Second IEEE Conference on Contro Applications, Sep. 13–16, 1993, Vancouver, B.C., pp. 811–816.

Radenkovic, Miloje S. and Ydstie B. Erik, "Using Persistent Excitation with Fixed Energy to Stabilize Adaptive Controllers and Obtain Hard Bounds for the Parameter Estimation Error", Proceedings of the American Control Conferrence, San Francisco, California, Jun. 1993, pp. 277–281.

Burdakov, Sergey F. and Toupitsyn, Mikhail I., "Robust Stability and Optimization of Controlled Oscillatory System", IEEE—1997, pp. 445–448.

* cited by examiner

*Primary Examiner*—Robert Beausoleil
*Assistant Examiner*—Tim Vo
(74) *Attorney, Agent, or Firm*—William A Munck

(57) ABSTRACT

The present invention provides a processing system that is capable of achieving substantially optimal control performance of a process facility on a "worst case" process system by accounting for changing system dynamics. The processing system includes a storage device and a processor. The storage device is operable to represent (i) at least one of a plurality of associated processes mathematically to define the various relationships among different inputs and outputs of the one or more represented associated processes, and (ii) uncertainty factors that are associated with these defined relationships. The uncertainty factors define a range of dynamics across which the one or more represented associated processes operate, an error in the mathematical representation, or, alternatively, some combination of the same. The processor is responsive to the mathematical representation and the uncertainty factors and is capable of determining tuning parameters for use by the control system to control the one or more represented associated processes and thereby cooperate to optimize said process facility.

20 Claims, 6 Drawing Sheets

CONTROLLERS THAT DETERMINE OPTIMAL TUNING PARAMETERS FOR USE IN PROCESS CONTROL SYSTEMS AND METHODS OF OPERATING THE SAME

TECHNICAL FIELD OF THE INVENTION

The present invention is directed, in general, to control systems for process facilities and, more specifically, to controllers that determine optimal proportional integral and derivative ("PID") tuning parameters for use in process control systems to globally optimize process facilities.

BACKGROUND OF THE INVENTION

Presently, process facilities (e.g., a manufacturing plant, a mineral or crude oil refinery, etc.) are managed using distributed control systems. Contemporary control systems include numerous modules tailored to control or monitor various associated processes of the facility. Conventional means link these modules together to produce the distributed nature of the control system. This affords increased performance and a capability to expand or reduce the control system to satisfy changing facility needs.

Process facility management providers, such as HONEYWELL, INC., develop control systems that can be tailored to satisfy wide ranges of process requirements (e.g., global, local or otherwise) and facility types (e.g., manufacturing, refining, etc.). A primary objective of such providers is to centralize control of as many processes as possible to improve an overall efficiency of the facility. Each process, or group of associated processes, has certain input (e.g., flow, feed, power, etc.) and output (e.g., temperature, pressure, etc.) characteristics associated with it.

In recent years, model predictive control ("MPC") techniques have been used to optimize certain processes as a function of such characteristics. One technique uses algorithmic representations to estimate characteristic values (represented as parameters, variables, etc.) associated with them that can be used to better control such processes. In recent years, physical, economic and other factors have been incorporated into control systems for these associated processes. Examples of such techniques are described in U.S. Pat. No. 5,351,184 entitled "METHOD OF MULTIVARIABLE PREDICTIVE CONTROL UTILIZING RANGE CONTROL;" U.S. Pat. No. 5,561,599 entitled "METHOD OF INCORPORATING INDEPENDENT FEEDFORWARD CONTROL IN A MULTIVARIABLE PREDICTIVE CONTROLLER;" U.S. Pat. No. 5,574,638 entitled "METHOD OF OPTIMAL SCALING OF VARIABLES IN A MULTI-VARIABLE PREDICTIVE CONTROLLER UTILIZING RANGE CONTROL;" and U.S. Pat. No. 5,572,420 entitled "METHOD OF OPTIMAL CONTROLLER DESIGN OF MULTIVARIABLE PREDICTIVE CONTROL UTILIZING RANGE CONTROL" (the "'420 Patent"), all of which are commonly owned by the assignee of the present invention and incorporated herein by reference for all purposes.

Generally speaking, one problem is that conventional efforts, when applied to specific processes, tend to be non-cooperative (e.g., non-global, non-facility wide, etc.) and may, and all too often do, detrimentally impact the efficiency of the process facility as a whole. For instance, many MPC techniques control process variables to predetermined set points. Oftentimes the set points are a best estimate of a value of the set point or set points. When a process is being controlled to a set point, the controller may not be able to achieve the best control performances, especially under process/model mismatch.

To further enhance the overall performance of a control system, it is desirable to design a controller that deals explicitly with plant or model uncertainty. The '420 Patent, for example, teaches methods of designing a controller utilizing range control. The controller is designed to control a "worst case" process. An optimal controller for the process is achieved and, if the actual process is not a "worst case process," the performance of the controller is better than anticipated.

There are a number of well known PID "tuning" formulas, or techniques, and the most common, or basic, PID algorithm includes three known user specified tuning parameters (K, $\tau_1$, $\tau_2$) whose values determine how the controller will behave. These parameters are determined either by trial and error or through approaches that require knowledge of the process. Although many of these approaches, which are commonly algorithms, have provided improved control, PID controller performance tuned by such algorithms usually degrades as process conditions change, requiring a process engineer to monitor controller performance. If controller performance deteriorates, the process engineer is required to "re-tune" the controller.

Controller performance deteriorates for many reasons, although the most common cause is changing dynamics of the process. Since PID controller performance has been related to the accuracy of the process model chosen, a need exists for a PID controller that allows for such uncertainty by accounting for changing system dynamics and, desirably, by incorporating the same before any tuning parameters are calculated. A further need exists for a means to extend the above-described MPC techniques into PID controller design techniques.

SUMMARY OF THE INVENTION

To address the above-discussed deficiencies of the prior art, it is a primary object of the present invention to provide a controller that determines a "best" controller to achieve optimal control performance within a process facility on a "worst case" process system and, more precisely, the controller allows for model uncertainty by accounting for changing system dynamics by incorporating the same before the tuning parameters are calculated.

In the attainment of this primary object, the present invention provides a process control system and a method of operating the same for controlling associated processes within a process facility. The control system includes at least one RPID controller that is associated with a processing system. The controller includes a storage device and a processor. The storage device is operable to represent (i) at least one of a plurality of associated processes mathematically to define the various relationships among different inputs and outputs of the one or more represented associated processes, and (ii) uncertainty factors that are associated with these defined relationships. The uncertainty factors define a range of dynamics across which the one or more represented associated processes operate, an error in the mathematical representation, or, alternatively, some combination of the same.

Responsive to the mathematical representation and the uncertainty factors, the processor is capable of determining (or is operable to) tuning parameters for use by the control system to control the one or more represented associated processes and thereby cooperate to optimize said process facility.

According to an advantageous embodiment of the present invention, a robust PID processing system determines the optimal controller tuning for the specified range of process dynamics. It is well known that process dynamics move within a range for a variety of reasons. For instance, the following list provides common plant occurrences that may change the way a process will respond to PID control: (i) process throughput is increased or decreased, (ii) feed stock quality is changed, (iii) seasonal temperature changes, and (iv) equipment becomes fouled. In each case, an RPID controller according to the present invention outperforms a conventionally tuned PID controller as the process dynamics shift, thus yielding increased economic benefits.

As introduced above, other controller tuning techniques commonly base PID tuning parameter results on a single process dynamic model. If uncertainty factors are specified for the gain, settling time, or dead-time, the calculated solution is simply "de-tuned" to compensate for the uncertainty. Unlike the robust PID of the present invention, these packages do not find the most responsive controller parameters for all models within an uncertainty range.

The foregoing has been tested in process plant applications such as within a stripper temperature controller wherein various PID tuning methods were applied, yielding the following results:

| Tuning Method | Standard Deviation, Deg C. |
|---|---|
| Ziegler-Nichols | 1.2 |
| IMC | 0.56 |
| Robust PID | 0.23 |

As this table shows, a robust PID controller performs significantly better than the other tuning methods. This is due in part because process "economic" performance is often closely linked to process variability, illustrating that the use of the robust PID processing system of the present invention may lead to superior control performance and higher process profitability. In point of fact, an implementation of a robust PID decreased the standard deviations of both the fluidized bed pressure and temperature by a factor of approximately six:

| Standard Deviation | Pressure Controller | Temperature Controller |
|---|---|---|
| IMC | 4.8068 | 0.3974 |
| Robust PID | 0.6925 | 0.0647 |

Those skilled in the art will understand that "controllers" may be implemented in hardware, software, or firmware, or some suitable combination of the same; in general, the use of computing systems in control systems for process facilities is well known. The phrase "associated with" and derivatives thereof, as used herein, may mean to include, be included within, interconnect with, contain, be contained within, connect to or with, couple to or with, be communicable with, cooperate with, interleave, be a property of, be bound to or with, have, have a property of, or the like.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in connection with the accompanying drawings, wherein like numbers designate like objects, and in which.

DETAILED DESCRIPTION

Figure 1A:
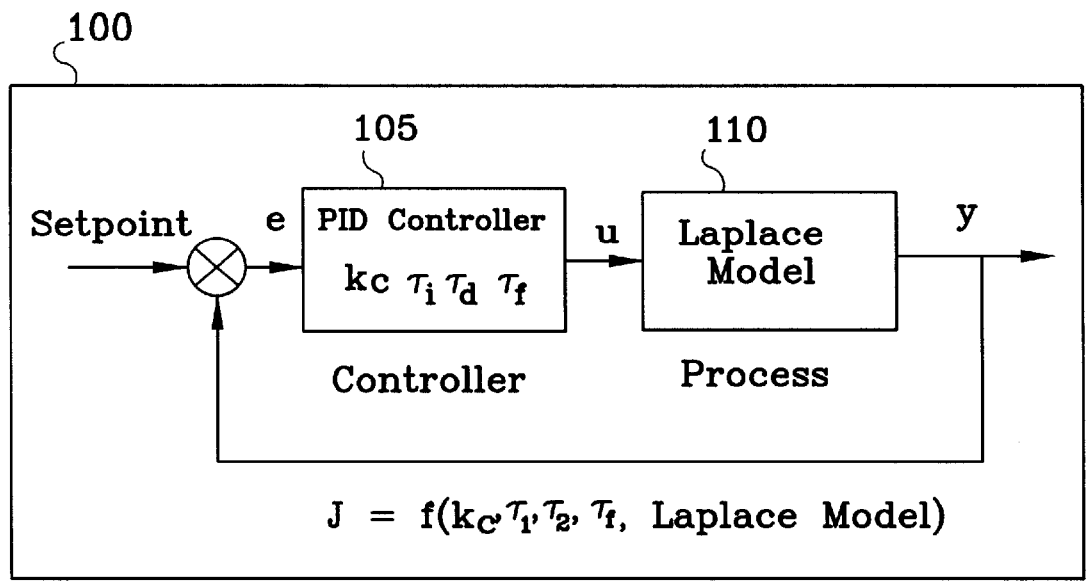
FIG. 1a illustrates a block diagram of a process control system according to the principles of the present invention.

Referring initially to FIG. 1a, illustrated is a block diagram of a process control system 100 according to the principles of the present invention. Exemplary control system 100 includes a controller 105 and a process 110. Exemplary controller 105 is a robust PID ("RPID") controller according to the present invention and is operable to provide reliable control performance, particularly when process 110 conditions vary or errors occur therewith. Exemplary process 110 may suitably include a plurality of "controllable" elements (e.g., valves, heaters, etc.) possibly specified in the form of a model (e.g., Laplace, ARX, FIR, Step-Response, etc.). According to the present embodiment, such a model can either be based on gathered data or data that is manually entered, or, alternatively, some suitable combination of the same.

It should be noted that process control system 100 illustratively includes a RPID controller loop and a first order lag. For the purposes hereof, the phrases "robust," "robustness," and derivatives thereof are defined broadly as the ability of control system 100 to operate consistently under a variety of operating conditions.

Exemplary process variables, "y", include temperature, pressure, level, flow, and the like. Exemplary input variables, or manipulated variables, "u", and exemplary output variables, or controlled variables, ("cv," e.g., regulated, restrained, optimized, etc.) are defined in the '420 Patent and make process 110 a dynamic process, having both manipulated variables and controlled variables.

Figure 1B:
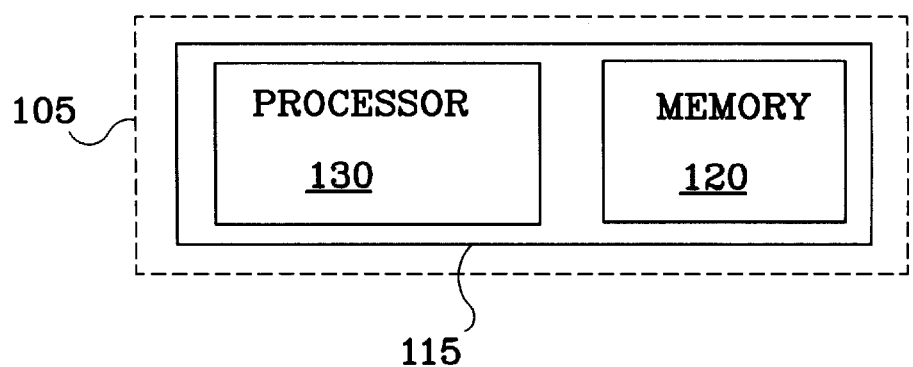
FIG. 1b illustrates a block diagram of a suitable processing system in accordance with the principles of the present invention.

According to the illustrated embodiment, process control system 100 controls associated processes (e.g., process 110) of a process facility using a plurality of optimal tuning variables. These tuning variables are advantageously generated using a processing system (i.e., defined broadly as any system or device whether based upon hardware, firmware, software, or some suitable combination of the same; an processing system 115 is illustrated in FIG. 1b and illustratively includes a memory, or other conventional storage device, 120 and a processor, or other conventional processing circuitry, 130), which may be associated with controller 105 or, alternatively, independent of the same (for the purposes hereof, it is assumed that the processing system is integrated with controller 105).

The controller 105 operates to determine, or calculate, one or more optimal PID tuning parameters based on engineering inputs. The determined tuning parameters are then integrated into process control system 100 via controller 105, which becomes a RPID controller through the tuning parameters. More particularly, controller 105 represents one or more of the associated processes mathematically, preferably within a memory associated therewith. The mathematical representation defines relationships among various inputs and outputs of the one or more associated processes. Controller 105 also represents one or more uncertainty factors, again, preferably within the memory. The uncertainty factors are associated with the defined relationships, and define (i) a range of dynamics across which the one or more associated processes operate, (ii) an error in the mathematical representation, or (iii) some suitable combination of the same. Controller 105, in response to, or as a function of, the mathematical representation and the uncertainty factors, determine one or more tuning parameters for use by control system 100 to control the one or more associated processes.

According to the illustrated embodiment, the objective function, or performance criteria, "J", is used to represent either process dynamic ranges or modeling errors, or, alternatively, some combination thereof:

$$J = f(k_c, \tau_i, \tau_d, \tau_f, \text{Model}(p)).$$

When properly used, RPID controller 105 is capable of providing consistent control performance over the range of identified process dynamics. The net result is improved regulatory control and, hence, values of RPID controller 105 constants are constrained to be within certain ranges. Exemplary tuning parameters, and their respective ranges, are:

1. $k_c$, the "proportional constant," is displayed during the calculation search is scaled but final value is unconstrained value; controller gain has no effective limits.
2. $\tau_i$, the "integral constant," terms are limited to positive values, a small value must be larger than zero (relatively smaller values imply relatively larger integration rates) while a large value (implies relatively no integral action) is arbitrarily set to 1.e30.
3. $\tau_d$, the "derivative constant," terms are limited to positive values, zero implying relatively no derivative action.
4. $\tau_f$, the "filter constant," terms are usually limited to positive values, zero implying no filter; if a discrete option is invoked, then values (which represent the discrete time filter coefficients) may be limited between −1 and +1, inclusive.
5. Model(p), the "model parameter," may either be based on gathered data or data that is manually entered, or, alternatively, some suitable combination of the same, and may take a model form such as Laplace, ARX, FIR, Step-Response, or the like.

In short, RPID controller 105 is a PID controller tuned to operate over a range of dynamics; it does not provide improved control for all dynamics. RPID controller 105 may advantageously be used wherever improved PID control has the potential to increase process yield, improve product quality, reduce equipment maintenance, minimize safety hazards, or the like. The principles of the present invention operate to generate a PID controller that is best suited to control a process over a range of identified dynamics. For instance, RPID is well-suited to tune loops beneath a multivariable predictive controller, as RPID controllers tend to maximize closed loop performance consistency.

For purposes of illustration, the discussion of FIGS. 2 through 6 refers concurrently to FIG. 1a and is provided to aspects and advantages of exemplary RPID controller 105, particularly as the same relates to the determination of optimal tuning parameters. Prior to undertaking such discussion, recall from above that contemporary PID controllers are tuned by process model-based techniques. When using such techniques, an engineer obtains information concerning process response to specific variable change. This information is used to form empirical models that are used to design a control system and, in particular, an associated controller.

A drawback is that there is a realistic limit to the amount of information the engineer can acquire concerning the process. In addition, a given process may change over time and thereby reducing model accuracy. This leads to inherent uncertainty in the design of the controller. Collectively, FIGS. 2 to 6 illustrate an example of the same along with an exemplary implementation of RPID controller 105 that illustrates improvements over contemporary implementations.

Figure 2:
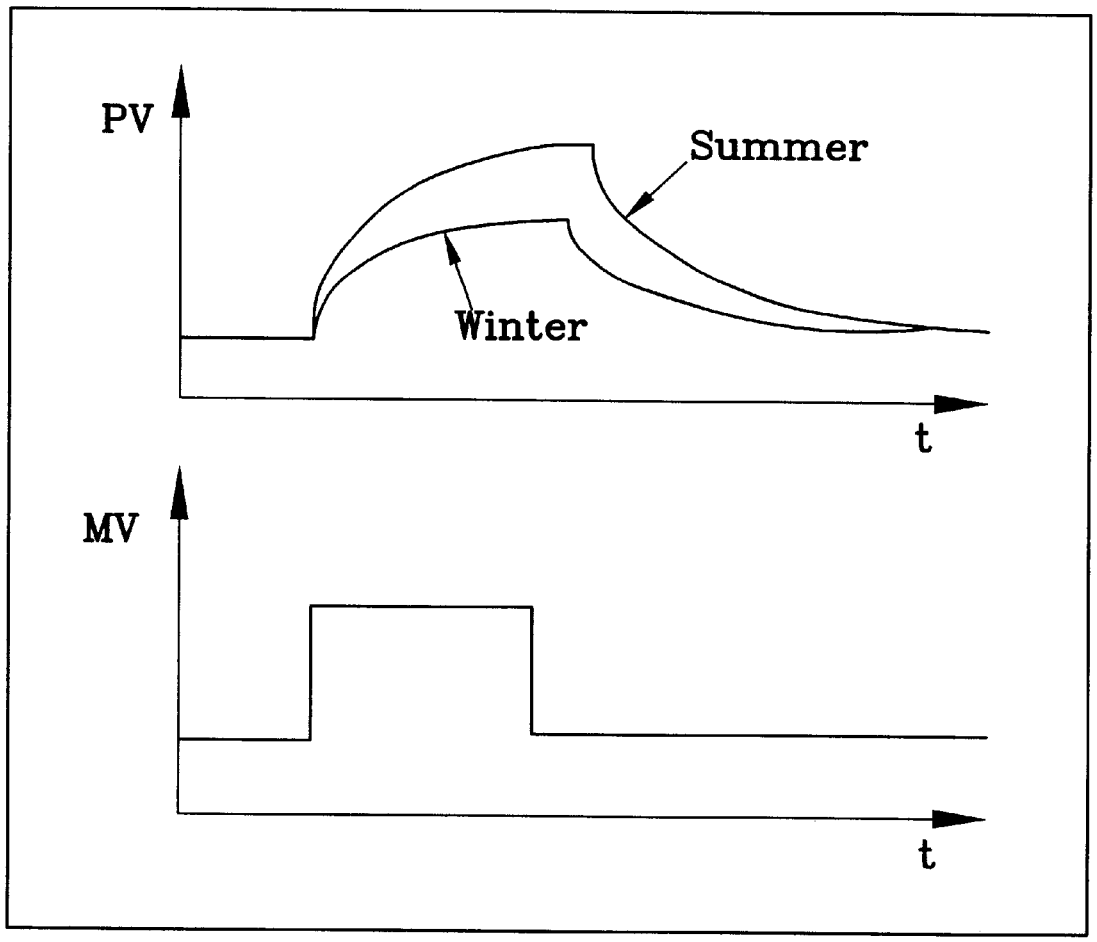
FIG. 2 illustrates a two-dimensional graphical model of process response curves for a fractionation unit during a summer and a winter seasons.

Turning next to FIG. 2, illustrated is a two-dimensional graphical model of process response curves for a fractionation unit during a summer and a winter seasons. Recall, with reference to this graph, note that most contemporary PID controllers are tuned by process model based techniques. When using these techniques, an engineer must obtain knowledge about how a given process responds to a specified variable change. This knowledge is then used to formulate empirical models that are used to design the control system. Unfortunately, there is always a limit to the amount of knowledge one can acquire about a process and, therefore, there is always an inherent uncertainty with regard to the final controller design. The following example will illustrate this point.

Assume that a process engineer is assigned to the fractionation unit, and he believes that the control of the tower could be improved and decides to obtain some process information. He collects data during both the summer and winter seasons and plots the process response curves as illustrated in FIG. 2. From this information, the engineer concludes that seasonal temperature changes are affecting the process dynamics of the tower. To design a PID controller that will control work well during both seasons, he decides to use a contemporary average, or nominal, process model.

Figure 3:
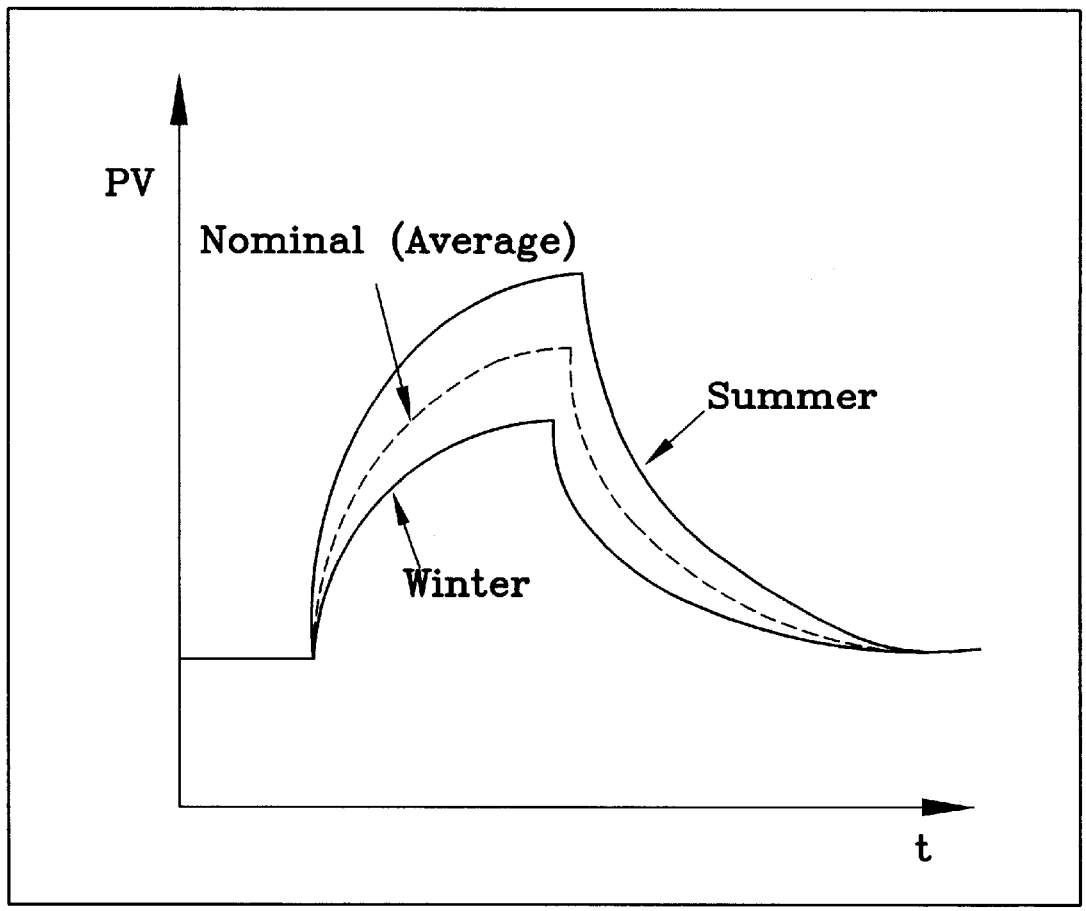
FIG. 3 illustrates a two-dimensional graphical model of a nominal model of the process response curves for the fractionation unit during the summer and the winter seasons.

Turning next to FIG. 3, illustrated is a two-dimensional graphical model of a nominal model of the process response curves for the fractionation unit during the summer and the winter seasons. The nominal model provides a "best" guess of the actual process model under the given circumstances. The nominal PID controller design, which is based on the nominal model, may be adjusted to "speed up" or "slow down" process control performance. In this case, "$t_{ei}$" represents an open-loop time constant and "$t_{ei}$" represents the closed-loop time constant.

Figure 4:
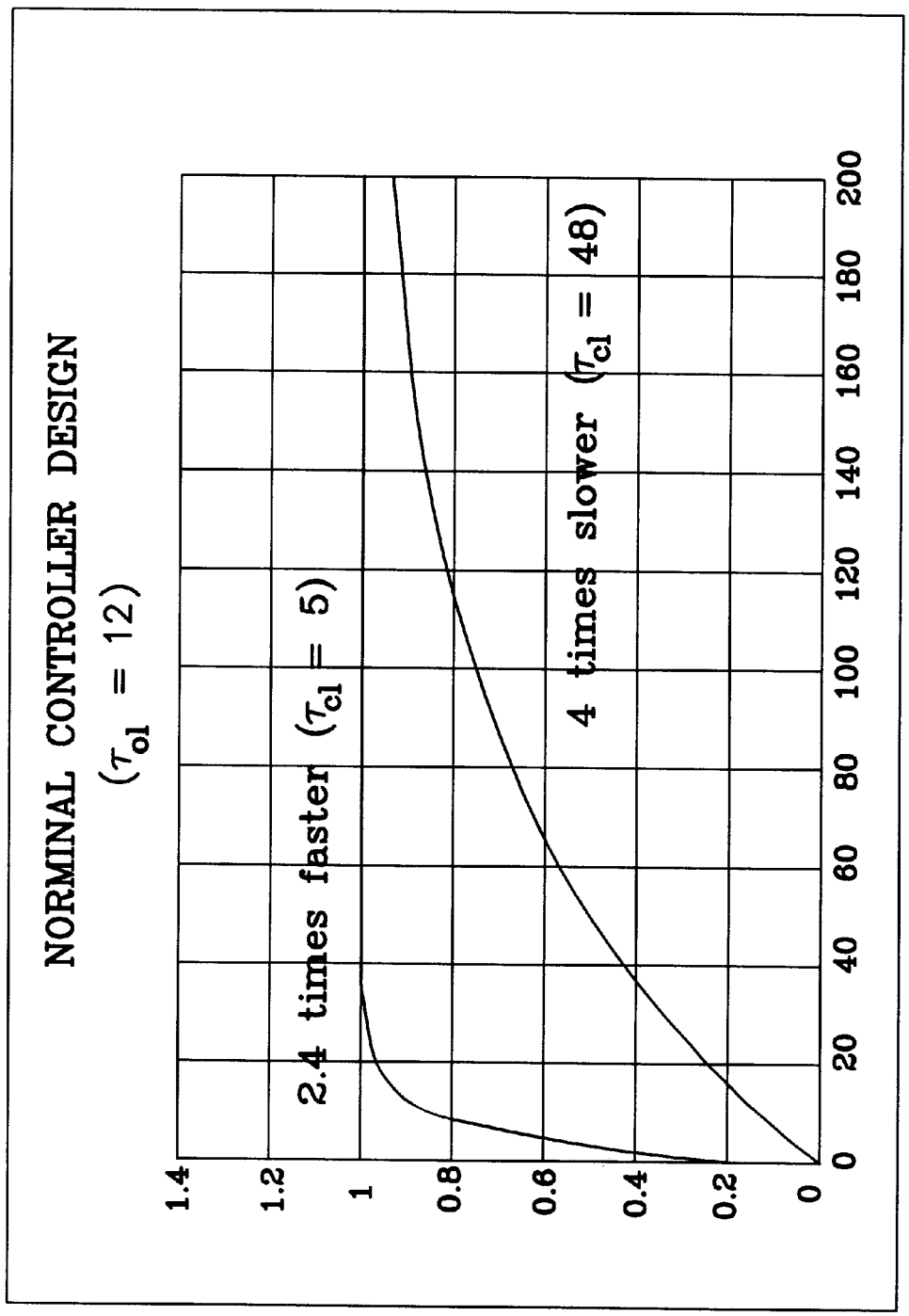
FIG. 4 illustrates a two-dimensional graphical model of a nominal controller design based upon the nominal model of the process response curves for the fractionation unit of FIG. 3.
Figure 5:
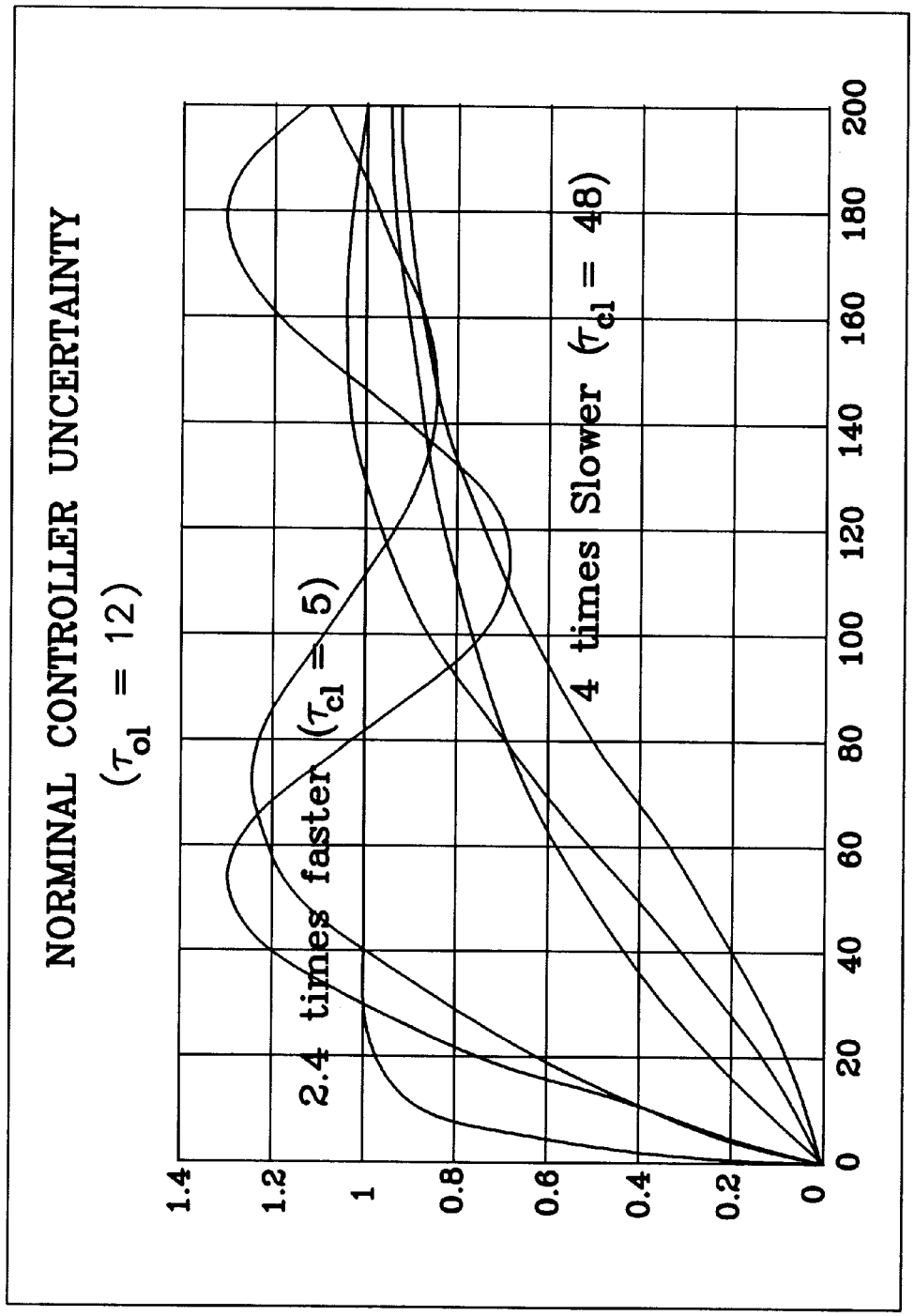
FIG. 5 illustrated is a two-dimensional graphical model of the nominal controller of FIG. 4 factoring to certain "uncertainties" factors.

Turning next to FIG. 4, illustrated is a two-dimensional graphical model of a nominal controller design based upon the nominal model of the process response curves for the fractionation unit of FIG. 3. This exemplary design may be tuned to be as "fast" or as "slow" as is required. So far, the engineer has done nothing that seems intuitively "wrong," however, there is a subtle problem—the engineer assumed the process models were correct, or accurate, and this is usually not the case. In point of fact, most identified process models are actually inaccurate by 20 to 40%. Model uncertainties of this magnitude often cause problems in nominal controller designs—when model mismatch occurs, nominal PID controller designs may yield undesirable results. Referring momentarily to FIG. 5, illustrated is a two-dimensional graphical model of the nominal controller of FIG. 4 factoring in certain "uncertainties". This graph illustrates an increase in oscillatory behavior as model mismatch (20–40% uncertainty) is introduced into the control system.

Figure 6:
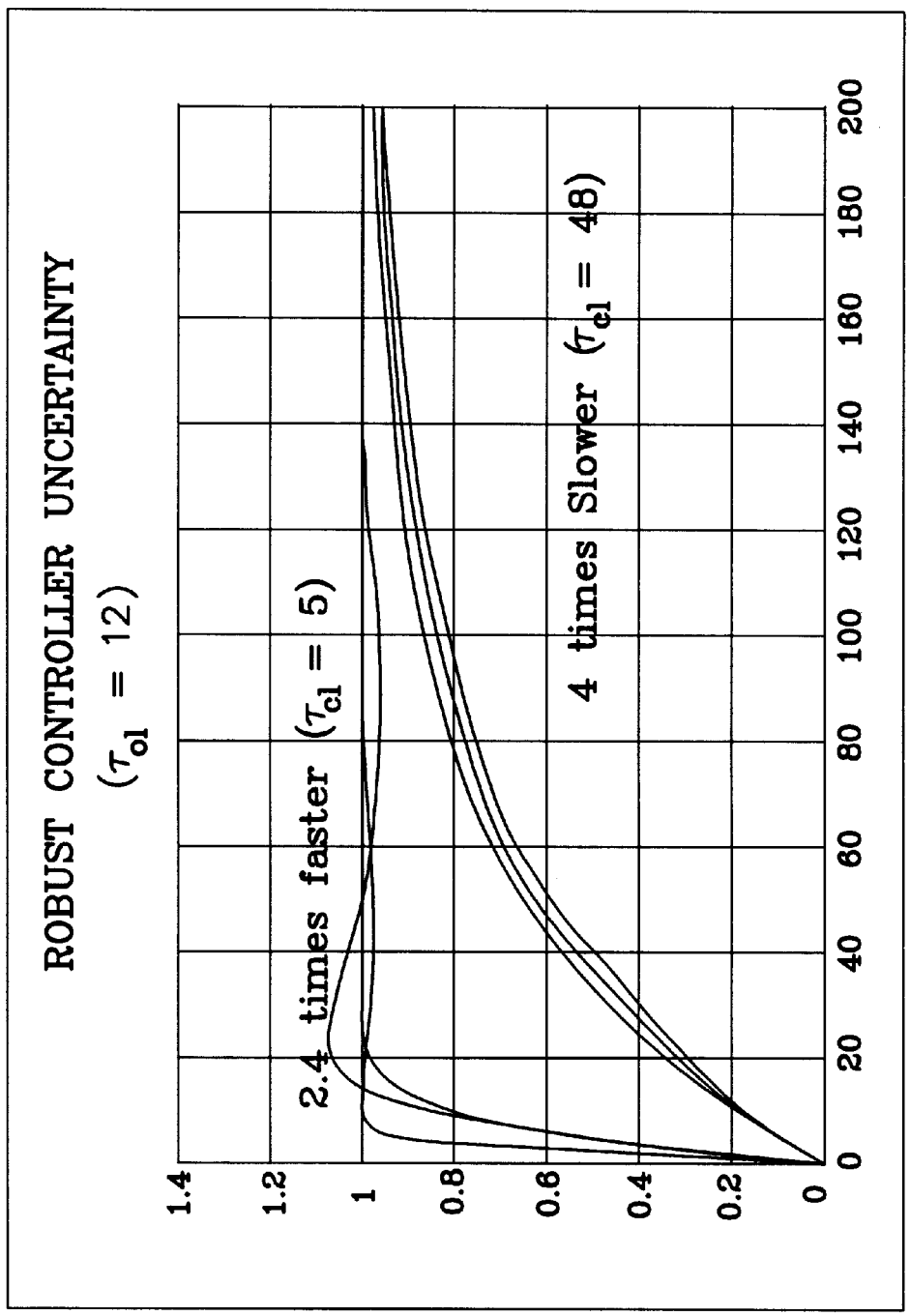
FIG. 6 illustrates a two-dimensional graphical model of a robust PID controller design based upon the principles of the present invention.

Turning next to FIG. 6, illustrated is a two-dimensional graphical model of a RPID controller design based upon the principles of the present invention. The graph illustrates controller design that is insensitive to model mismatch, found using robust design techniques that minimize the bandwidth of the nominal PID controller design to yield a continuum of good performance across the expected dynamic range.

The exemplary RPID controller design performs well despite the uncertainties contained within the process models. It also maintains good control as the performance of the controller is pushed from a sluggish controller ($t_{ef}=48$) to an aggressive controller ($t_{ef}=5$). This design is inherently stable and its performance may be adjusted to yield "smooth" control responses.

Assuming that processing system 115 uses integral squared error and a weighted two norm movement penalty as its control performance criteria to find an optimal PID controller design, the design process begins with the standard PID controller loop and an optimal first order lag. The first step in the robust design process is to specify the identified process model in the form of a mathematical representation, such as Laplace model of (p). The mathematical representation may be either based on data or manually entered. Uncertainty factors are also represented and used to represent either process dynamic ranges or modeling errors. Processing system 115 calculates optimal tuning coefficients ($K_c$, $t_i$, $t_d$, $t_f$) through the use of the proprietary min-max algorithm disclosed in the '420 Patent, namely, the proprietary "min-max" formula described therein.

The algorithm operates on a number of different conventional PID equation forms and essentially calculates tuning coefficients that yield the best control performance for the worst case process dynamics. An important aspect of the present invention is that processing system not directed at deriving optimal performance from RPID controller 105 in the worst case, but, rather, to have a net effect of improving the overall controller performance within the specified dynamic range, thereby causing RPID controller 105 to be relatively stable and increasingly insensitive to modeling errors.

It is therefore an object of a robust control design of the present invention to deal explicitly with plant or model uncertainty. In general terms, it is desired that the controller maintain a predetermined level of performance even as the process changes. The robust control design insures both robust stability and robust performance. The former insures that the uncertainty, while the later insures that reasonable performance can be expected for the same set of plants.

Therefore, there is provided by the present invention, a method of designing an optimal controller utilizing range control. A process control system which includes at least one manipulated variable and at least one controlled variable. provides a method for robust control of a process. Predetermined constraints of the manipulated variables and the controlled variables, and the present values of the manipulated variables are obtained. The controller is loaded with parameters which define an optimal controller, the parameters being calculated off-line. To determine the parameters a single min-max statement may be defined for a worst case model of the process which operates in conjunction with a best case controller. The single min-max statement is converted to a corresponding canonical expression the form of a minimization problem, the resultant solution of the minimization problem being the parameter. New values are calculated for the controlled variable for a predetermined number of points in the future, such that the values of the controlled variables are within the predetermined range thereby obtaining an optimal robustness of the resultant controller. The manipulated variables may also be calculated to be within predetermined constraints, and the controlled variables to fall within a predetermined range when controllable. From a plurality of solutions, a most robust solution is selected. Then the manipulated variables are adjusted to cause the process control system to drive the values of the controlled variables to the calculated values.

Although the present invention and its advantages have been described in detail, those skilled in the art should understand that they can make various changes, substitutions and alterations herein without departing from the spirit and scope of the invention in its broadest form.

What is claimed is:

1. A processing system for use with a control system that controls associated processes of a process facility, comprising:
    a storage device that is operable to represent (i) at least one of said associated processes mathematically, said mathematical representation defining relationships among inputs and outputs of said at least one of said associated processes, and (ii) uncertainty factors that are associated with said defined relationships, said uncertainty factors defining at least one of a range of dynamics across which said at least one of said associated processes operates and an error in said mathematical representation; and
    a processor that is capable of determining, in response to said mathematical representation and said uncertainty factors, tuning parameters for use by said control system to control said at least one of said associated processes and thereby cooperate to optimize said process facility.

2. The processing system set forth in claim 1 wherein said storage device is further operable to represent common plant occurrences from a group consisting of changes in process throughput, feed stock quality, seasonal temperature, and equipment status.

3. The processing system set forth in claim 1 wherein said uncertainty factors are associated with an objective function, J, wherein $J=f(k_c, \tau_i, \tau_d, \tau_f, \text{Model}(p))$.

4. The processing system set forth in claim 1 wherein said uncertainty factors are associated with at least one of a proportional constant, an integral constant, a derivative constant, and a filter constant.

5. The processing system set forth in claim 2 wherein said processor determines said tuning parameters in response to said common plant occurrences.

6. The processing system set forth in claim 3 wherein said Model(p) is selected from a group consisting of Laplace, ARX, FIR, Step-Response.

7. The processing system set forth in claim 1 wherein said uncertainty factors are associated with an objective function, J, wherein $J=f(k_c, \tau_i, \tau_d, \tau_f, Model(p))$.

8. A method of operating a processing system for use with a control system that controls associated processes of a process facility, comprising the step of:

representing in a storage device (i) at least one of said associated processes mathematically, said mathematical representation defining relationships among inputs and outputs of said at least one of said associated processes, and (ii) uncertainty factors that are associated with said defined relationships, said uncertainty factors defining at least one of a range of dynamics across which said at least one of said associated processes operates and an error in said mathematical representation; and determining with a processor, in response to said mathematical representation and said uncertainty factors, tuning parameters for use by said control system to control said at least one of said associated processes and thereby cooperate to optimize said process facility.

9. The method of operating a process control system set forth in claim 8 further comprising the step of representing in said storage device common plant occurrences selected from a group consisting of changes in process throughput, feed stock quality, seasonal temperature, and equipment status.

10. The method of operating a process control system set forth in claim 8 wherein said uncertainty factors are associated with an objective function, J, wherein $J=f(k_c, \tau_i, \tau_d, \tau_f, Model(p))$.

11. The method of operating a process control system set forth in claim 8 wherein said uncertainty factors are associated with at least one of a proportional constant, an integral constant, a derivative constant, and a filter constant.

12. The method of operating a process control system set forth in claim 8 wherein said uncertainty factors are associated with an objective function, J, wherein $J=f(k_c, \tau_i, \tau_d, \tau_f, Model(p))$.

13. The method of operating a process control system set forth in claim 9 further comprising the step of determining said tuning parameters with said processor in response to said common plant occurrences.

14. The method of operating a process control system set forth in claim 10 wherein said Model(p) is selected from a group consisting of Laplace, ARX, FIR, Step-Response.

15. A processing system for use with a control system that controls associated processes of a process facility, comprising:

a storage device that is operable to represent (i) at least one of said associated processes mathematically, said mathematical representation defining relationships among inputs and outputs of said at least one of said associated processes, and (ii) uncertainty factors that are associated with said defined relationships, said uncertainty factors defining at least one of a range of dynamics across which said at least one of said associated processes operates and an error in said mathematical representation, and said uncertainty factors are associated with at least one of a proportional constant, an integral constant, a derivative constant, and a filter constant; and a processor that is capable of determining, in response to said mathematical representation and said uncertainty factors, tuning parameters for use by said control system to control said at least one of said associated processes and thereby cooperate to optimize said process facility.

16. The processing system set forth in claim 15 wherein said storage device is further operable to represent common plant occurrences from a group consisting of changes in process throughput, feed stock quality, seasonal temperature, and equipment status.

17. The processing system set forth in claim 15 wherein said uncertainty factors are associated with an objective function, J, wherein $J=f(k_c, \tau_i, \tau_d, \tau_f, Model(p))$.

18. The processing system set forth in claim 15 wherein said uncertainty factors are associated with an objective function, J, wherein $J=f(k_c, \tau_i, \tau_d, \tau_f, Model(p))$.

19. The processing system set forth in claim 16 wherein said processor determines said tuning parameters in response to said common plant occurrences.

20. The processing system set forth in claim 17 wherein said Model (p) is selected from a group consisting of Laplace, ARX, FIR, Step-Response.

* * * * *